(12) United States Patent
Hille et al.

(10) Patent No.: US 7,871,589 B2
(45) Date of Patent: Jan. 18, 2011

(54) PYROGENICALLY PREPARED SILICON DIOXIDE WITH A LOW THICKENING EFFECT

(75) Inventors: Andreas Hille, Loerrach (DE); Florian Felix Kneisel, Frankfurt (DE); Volker Hamm, Bad Saeckingen (DE); Matthias Rochnia, Ortenberg-Bleichenbach (DE)

(73) Assignee: Evonik Degussa GmbH, Essen (DE)

( * ) Notice: Subject to any disclaimer, the term of this patent is extended or adjusted under 35 U.S.C. 154(b) by 383 days.

(21) Appl. No.: 12/124,660

(22) Filed: May 21, 2008

(65) Prior Publication Data
US 2008/0290317 A1 Nov. 27, 2008

Related U.S. Application Data

(60) Provisional application No. 60/940,192, filed on May 25, 2007.

(30) Foreign Application Priority Data
May 21, 2007 (EP) .................................. 07108557

(51) Int. Cl.
*C01B 33/113* (2006.01)
(52) U.S. Cl. .................... 423/335; 423/336; 430/108.7; 524/492; 524/493; 524/494; 501/39; 106/482; 106/491
(58) Field of Classification Search ................. 423/335, 423/336; 430/108.7; 524/492, 493, 494; 501/39; 106/482, 491
See application file for complete search history.

(56) References Cited

U.S. PATENT DOCUMENTS 6,063,354 A 5/2000 Mangold et al.

2003/0138715 A1 7/2003 Barthel et al.

FOREIGN PATENT DOCUMENTS

| DE | 197 56 840 | 7/1998 |
| DE | 101 45 162 | 4/2003 |
| DE | 10 2004 063 762 | 7/2006 |
| DE | 10 2005 007 753 | 8/2006 |
| EP | 1 004 545 | 5/2000 |
| WO | WO 2004/054929 A1 | 7/2004 |

OTHER PUBLICATIONS

P. Pfeifer, et al., "Fractal BET and FHH Theories of Adsorption: A Comparative Study", Proc. R. Soc. Lond. A., 423, pp. 169-188, 1989.

*Primary Examiner*—Timothy C Vanoy
*Assistant Examiner*—Michelle Hou
(74) *Attorney, Agent, or Firm*—Oblon, Spivak, McClelland, Maier & Neustadt, L.L.P.

(57) ABSTRACT

Provided is a pyrogenically prepared $SiO_2$ powder in the form of aggregated primary particles having a statistical thickness surface area (STSA) of 10-500 $m^2/g$, a thickening action based on the STSA of 4-8 $mPas \cdot g/m^2$, and a micropore volume of 0.03-0.07 $cm^3/g$, and a process for preparing the pyrogenic $SiO_2$ powder, which involves: introducing hydrolyzable silicon compounds, a primary gas comprising oxygen, and a primary combustion gas into a mixing chamber to produce a mixture; igniting the mixture in a burner to produce a flame, which is burned into a reaction chamber to produce the pyrogenic $SiO_2$ powder and gaseous substances; and separating the pyrogenic $SiO_2$ powder from the gaseous substances, wherein a ratio of the amount of primary combustion gas introduced to a stoichiometric amount of primary combustion gas required is referred to as $gamma_{primary}$ and has a value of less than 1, and wherein a ratio of the amount of primary gas comprising oxygen introduced to a stoichiometric amount of primary gas comprising oxygen required is referred to as $lambda_{primary}$ and has a value of greater than 1.

28 Claims, 1 Drawing Sheet

PYROGENICALLY PREPARED SILICON DIOXIDE WITH A LOW THICKENING EFFECT

CROSS-REFERENCE TO RELATED APPLICATIONS

The present application claims priority to U.S. provisional patent application 60/940,192, filed on May 25, 2007, and European patent application EP 07108557.5, filed on May 21, 2007. U.S. provisional patent application 60/940,192 and European patent application EP 07108557.5 are hereby incorporated by reference in their entirety.

BACKGROUND OF THE INVENTION

1. Field of the Invention

The present invention relates to a pyrogenically prepared silicon dioxide (fumed silica) powder having a low thickening effect, a process for preparing the pyrogenic silicon dioxide powder, and a dispersion comprising the pyrogenic silicon dioxide powder.

2. Discussion of the Background

DE-A-10145162 describes a hydrophilic, pyrogenic silicon dioxide in the form of aggregated primary particles having an average particle size of less than 100 nm which preferably has a specific surface area of 25-500 m$^2$/g (measured by the BET method in accordance with DIN 66131 and 66132) with a minimal surface roughness. The pyrogenic silicon dioxide further preferably has a fractal surface dimension of less than or equal to 2.3 and/or a fractal mass dimension of less than or equal to 2.8.

DE-A-102004063762 describes a hydrophilic, pyrogenic silicon dioxide in the form of aggregated primary particles having an average particle size of 0.5-1000 nm which preferably has a specific surface area of 1-1000 m$^2$/g (measured by the BET method in accordance with DIN 66131 and 66132). The pyrogenic silicon dioxide additionally preferably has a fractal surface dimension of less than or equal to 2.3 and/or a fractal mass dimension of less than or equal to 2.8.

DE-A-102005007753 describes a hydrophilic, pyrogenic silicon dioxide in the form of aggregated primary particles having an average particle size of 0.5-1000 nm which preferably has a specific surface area of more than 10 m$^2$/g, preferably 75-350 m$^2$/g (measured by the BET method in accordance with DIN 66131 and 66132). The pyrogenic silicon dioxide additionally preferably has a fractal surface dimension of less than or equal to 2.3 and/or a fractal mass dimension of less than or equal to 2.8.

The hydrophilic, pyrogenic silicon dioxides described in DE-A-10145162, DE-A-102004063762 and DE-A-102005007753 are said to exhibit an increased thickening action as compared to other conventional silicon dioxides.

Liquids useful for determining the thickening action of the pyrogenic silicon dioxide include oligomeric or polymeric resins in organic solvents.

The surface roughness of the pyrogenic silicon dioxide can be quantified by means of the theory of fractals. Fractals are structures which are similar on different length scales. Many properties of fractals can be described using power laws. When, for example, the increase in mass (m) with radius (r) is examined, a mass-fractal dimension ($d_m$) of 3 is found for the limiting case of a compact sphere. For a structure which possesses cavities and pores, the resulting mass-fractal dimension ($d_m$) is less than 3.

Surfaces can also possess fractal properties. Here, the size of the surface goes up with the radius. For a perfectly smooth surface, the surface-related dimension is 5.

For fumed silicas, the mass-fractal dimension ($d_m$) is generally in the range of 1.5-2.0 and the surface-related dimensions are approximately 2.0.

DE-A-19756840 describes a pyrogenic silicon dioxide which has a BET surface area of 30-150 m$^2$/g and a fractal BET dimension, determined by $N_2$ adsorption in the pressure range p/p0=0.5 to 0.8, in accordance with the fractal BET theory for multilayer adsorption by the method specified by Pfeifer, P., Obert, M., Cole, M. W., Proc. R. Soc. London, A 423, 169 (1989), of less than 2.605. The pyrogenic silicon dioxide described in DE-A-19756840 can be used, for example, for polishing, with a higher erosion rate being observed, due to an increased surface roughness, as compared to other conventional silicon dioxides.

The pyrogenic silicon dioxide described in DE-A-19756840 is obtained by a flame hydrolysis process, while maintaining a hydrogen ratio gamma of less than 1 and an oxygen ratio lambda of less than 1. The ratio of the amount of hydrogen introduced, including the feed hydrogen plus the hydrogen from the raw materials, to the stoichiometric amount hydrogen required is referred to as gamma. The ratio of the amount of oxygen introduced, including the feed oxygen, to the stoichiometric amount of oxygen required is referred to as lambda.

SUMMARY OF THE INVENTION

The present invention relates to a pyrogenically prepared silicon dioxide powder having a low thickening effect, a process for preparing the pyrogenic silicon dioxide powder, and a dispersion comprising the pyrogenic silicon dioxide powder.

An exemplary aspect of the present invention is to provide a pyrogenically prepared silicon dioxide powder in the form of aggregated primary particles having a statistical thickness surface area (STSA) of 10-500 m$^2$/g, a thickening action based on the STSA of 4-8 mPas·g/m$^2$, and a micropore volume of 0.03-0.07 cm$^3$/g.

Another exemplary aspect of the present invention is to provide a process for preparing the pyrogenic silicon dioxide powder comprising: introducing one or more hydrolyzable silicon compounds, a primary gas comprising oxygen, and a primary combustion gas into a mixing chamber to produce a mixture; igniting the mixture in a burner to produce a flame, which is burned into a reaction chamber to produce the pyrogenic silicon dioxide powder and gaseous substances; and separating the pyrogenic silicon dioxide powder from the gaseous substances, wherein a ratio of the amount of primary combustion gas introduced to a stoichiometric amount of primary combustion gas required is referred to as gamma$_{primary}$ and has a value of less than 1, and wherein a ratio of the amount of primary gas comprising oxygen introduced to a stoichiometric amount of primary gas comprising oxygen required is referred to as lambda$_{primary}$ and has a value of greater than 1.

Another exemplary aspect of the present invention is to provide a dispersion comprising the pyrogenic silicon dioxide powder.

The foregoing discussion exemplifies certain aspects of the present invention. Additional exemplary aspects of the present invention are discussed in the following detailed description of the invention.

DETAILED DESCRIPTION OF THE INVENTION

Figure 1:
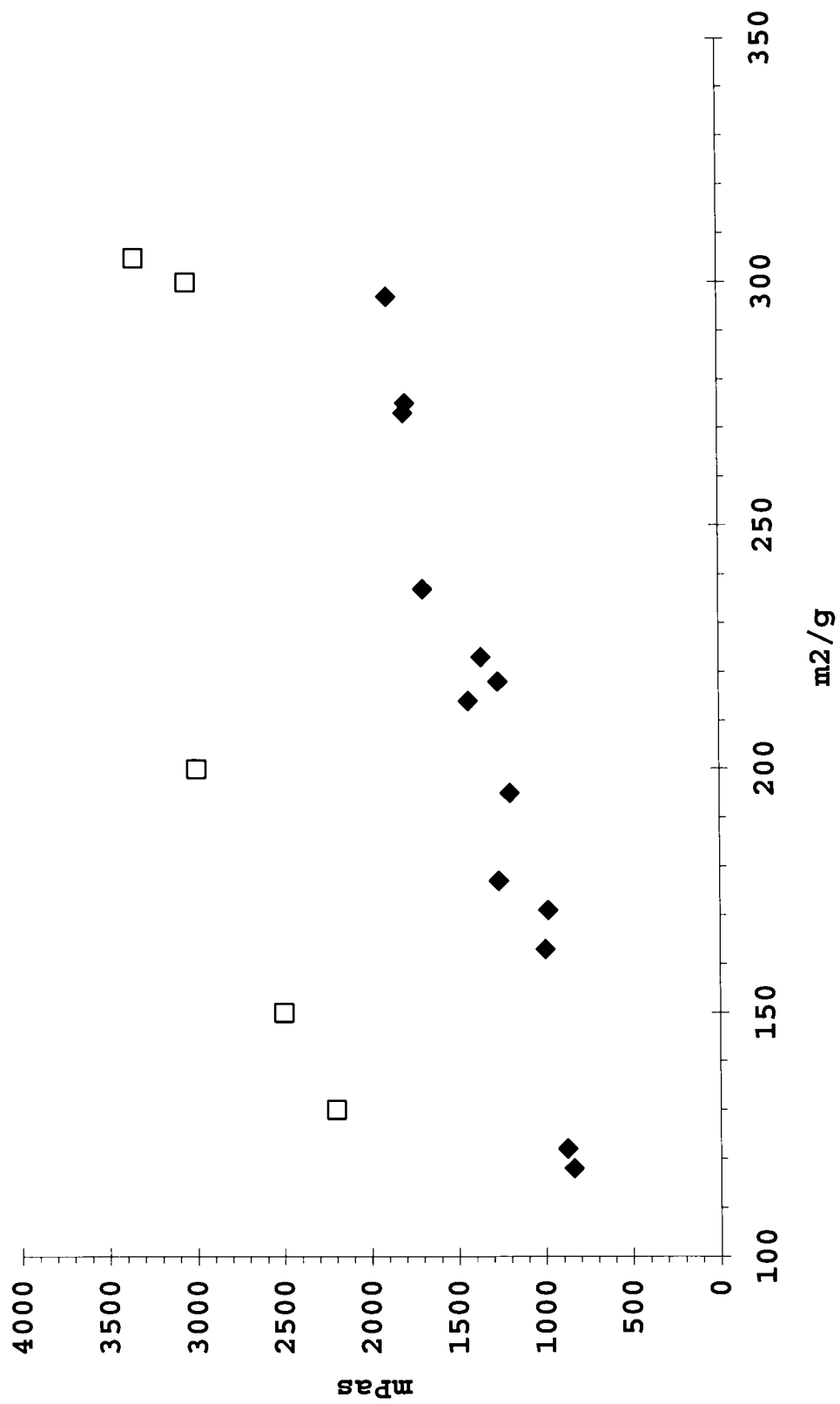
FIG. 1 illustrates thickening (mPas) as a function of STSA ($m^2/g$) for the pyrogenic silicon dioxide powder of Examples 1-13 of the present invention and comparative conventional pyrogenic silicon dioxide powders.

Unless specifically defined, all technical and scientific terms used herein have the same meaning as commonly understood by a skilled artisan in the relevant technological field (e.g., organic chemistry, chemical engineering, etc.).

All processes, materials and examples similar or equivalent to those described herein can used in the practice or testing of the present invention, with suitable processes, materials and examples being described herein. Accordingly, the processes, materials and examples described herein are for illustrative purposes only and are therefore not intended to be limiting, unless otherwise specified.

All patent applications, patent application publications, patents, scientific and technological literature, publications and references specifically mentioned herein are hereby incorporated by reference in their entirety. In case of conflict, the present specification, including definitions set forth herein, are controlling.

Where a closed or open-ended numerical range is described herein, all values and subranges within or encompassed by the numerical range are specifically included as belonging to the original disclosure of the present application as if these values and subranges had been explicitly written out in their entirety.

The present invention provides a pyrogenically prepared silicon dioxide powder in the form of aggregated primary particles having a statistical thickness surface area (STSA) of 10-500 $m^2/g$, a thickening action based on the STSA of 4-8 mPas·$g/m^2$, and a micropore volume of 0.03-0.07 $cm^3/g$.

Primary particles are understood to include particles that are initially formed in the reaction and which may fuse together to form aggregates in the further course of the reaction. Aggregates are understood to include primary particles of similar structure and size that have fused together, with the surface area of the aggregate being smaller than that of the sum of the surface areas of the individual, isolated primary particles. A plurality of aggregates and/or individual primary particles may congregate to form agglomerates, wherein the aggregates and/or primary particles are in point contact with one another. Agglomerates can be disrupted by the introduction of energy as a function of the degree to which the aggregates and/or particles are interfused.

The statistical thickness surface area (STSA) is the external surface area of the particles that make up the pyrogenic silicon dioxide powder without taking into account the surface produced by micropores. The STSA surface area is determined by the t method (DIN 66135-2, ASTM D 5816), using the following layer thickness equation:

$$t=(26.6818/(0.0124806-\log(p/p_0)))^{0.4}$$

wherein p is gas pressure (measured in Pa) and $p_0$ is saturation vapour pressure (measured in Pa) of the adsorptive at the measurement temperature.

On account of the microporous structure of the silicon dioxide particles, determining the surface area by means of the BET method (DIN 66131) is unsuitable for characterization purposes. In general, the BET surface area is 20-150% higher than the STSA.

The thickening action (measured in mPas) is determined in a dispersion of the silicon dioxide powder in an unsaturated polyester resin and a diol or a polyol, which are preferably in solution at 30-80 wt. %, more preferably at 60-70 wt. %, in an olefinic reactive diluent as a solvent, such as monstyrene, for example. Examples of the unsaturated polyester resin include cocondensates of ortho- or meta-phthalic acid, and maleic or fumaric acid, or their anhydrides. Examples of the diol include low molecular mass diols, such as ethylene glycol, 1,2- or 1,3-propanediol, 1,2- or 1,3- or 1,4-butanediol or neopentyl glycol (($CH_3$)$_2$C($CH_2OH$)$_2$). The polyol may be pentaerythritol, for example.

The viscosity of the polyester resin is 1300+/−100 mPas at a temperature of 22° C. 7.5 g of silicon dioxide powder are introduced to 142.5 g of polyester resin at a temperature of 22° C. and dispersed by means of a dissolver at 3000 $min^{-1}$. A further 90 g of the unsaturated polyester resin are added to 60 g of this dispersion, and the dispersing operation is repeated.

Designated as the thickening action is the viscosity value in mPas of the dispersion at 25° C., measured with a rotational viscometer at a shear rate of 2.7 $s^{-1}$. An example of a suitable unsaturated polyester resin is Ludopal® P6 available from BASF.

The STSA of the pyrogenic silicon dioxide powder of the present invention is preferably 30-300 $m^2/g$, 40-225 $m^2/g$, 50-150 $m^2/g$ or 60-75 $m^2/g$.

The thickening action of the pyrogenic silicon dioxide powder of the present invention, based on the STSA, is preferably 5-7 mPas $g/m^2$, 5.25-6.75 mPas $g/m^2$, 5.50-6.50 mPas·$g/m^2$ or 5.75-6.25 mPas·$g/m^2$.

The micropore volume (pore width is less than 2 nm) of the pyrogenic silicon dioxide powder of the present invention is preferably 0.035-0.065 $cm^3/g$, 0.040-0.060 $cm^3/g$ or 0.045-0.55 $cm^3/g$.

The mesopore volume (pore width is 2-50 nm) of the pyrogenic silicon dioxide powder of the present invention is preferably 0.15-0.60 $cm^3/g$, 0.20-0.50 $cm^3/g$ or 0.30-0.40 $cm^3/g$.

The fractal dimension ($D_m$) of the pyrogenic silicon dioxide powder of the present invention is preferably 2.61-2.85, greater than 2.61 but less than or equal to 2.85, 2.63-2.78, 2.65-2.76 or 2.67-2.74. The fractal dimension ($D_m$) is determined by $N_2$ adsorption in the pressure range $p/p_0$=0.5 to 0.8 in accordance with the fractal BET theory for multilayer adsorption by the method specified by Pfeifer, P., Obert, M., Cole, M. W., Proc. R. Soc. London, A 423, 169 (1989).

The average primary particle diameter of the pyrogenic silicon dioxide powder of the present invention is preferably greater than 10 nm and less than 40 nm, with a particular preference of 15-38 nm or 20-33 nm. The average primary particle diameter is preferably determined by counting from Transmission Electron Microscope (TEM) micrographs.

The dibutyl phthalate (DBP) absorption of the pyrogenic silicon dioxide powder of the present invention is preferably less than or equal to 300 g/100 g dibutyl phthalate. Particular preference is given to a DBP absorption of from 200 to less than 300 g/100 g dibutyl phthalate, and 250-290 g/100 g dibutyl phthalate.

The present invention also provides a process for preparing the pyrogenic silicon dioxide powder comprising:

introducing one or more hydrolyzable silicon compounds, a primary gas comprising oxygen, and a primary combustion gas into a mixing chamber to produce a mixture;

igniting the mixture in a burner to produce a flame, which is burned into a reaction chamber to produce the pyrogenic silicon dioxide powder and gaseous substances; and separating the pyrogenic silicon dioxide powder from the gaseous substances, wherein a ratio of the amount of primary combustion gas introduced to a stoichiometric amount of primary combustion gas required is referred to as $gamma_{primary}$ and has a value of less than 1, and wherein a ratio of the amount of primary gas comprising oxygen introduced to a stoichiometric amount of primary gas comprising oxygen required is referred to as $lambda_{primary}$ and has a value of greater than 1.

The pyrogenic silicon dioxide powder in accordance with the present invention, may be prepared by flame hydrolysis, by introducing the gaseous starting materials in a stoichiometric amount such that the amount of primary combustion gas introduced is at least sufficient to hydrolyze the reactants. The amount of primary combustion gas required for this reaction is referred to as the stoichiometric amount of primary combustion gas. The ratio of the amount of primary combustion gas introduced to the stoichiometric amount of primary combustion gas required is referred to as $gamma_{primary}$ in accordance with the following equation:

$$gamma_{primary} = \frac{\text{primary combustion gas introduced (mole)}}{\text{stoichiometric primary combustion gas (mole)}}$$

The process of the present invention is carried out at a $gamma_{primary}$ value of less than 1, preferably 0.40-0.95, 0.45-0.90, 0.50-0.85, 0.55-0.80, 0.60-0.75 or 0.65-0.70, and particularly preferably 0.50-0.80.

The pyrogenic silicon dioxide powder in accordance with the present invention, may be prepared by flame hydrolysis, by introducing the gaseous starting materials in a stoichiometric amount such that the amount of primary gas comprising oxygen (e.g., air) introduced is at least sufficient to convert the silicon starting compound into silicon dioxide and to convert any excess unreacted combustion gas remaining. The amount of primary gas comprising oxygen required is referred to as the stoichiometric amount of primary gas comprising oxygen. The ratio of the amount of primary gas comprising oxygen introduced to the stoichiometric amount of primary gas comprising oxygen required is referred to as $lambda_{primary}$ in accordance with the following equation:

$$lambda_{primary} = \frac{\text{primary gas comprising oxygen introduced (mole)}}{\text{stoichiometric primary gas comprising oxygen (mole)}}$$

The process of the present invention is carried out at a $lambda_{primary}$ value of greater than 1, preferably greater than 1 and less than or equal to 10, more preferably 2-9, 3-8, 4-7 or 5-6, and particularly preferably 2-5.

The process of the present invention may further comprise supplying a secondary combustion gas at one or more points within the reaction chamber. However, unlike the primary combustion gas, which is passed from the mixing chamber into the reaction chamber, the secondary combustion gas is supplied directly into the reaction chamber.

The ratio of the amount of total combustion gas (e.g., primary combustion gas and secondary combustion gas) to the stoichiometric amount of total combustion gas required is referred to as $gamma_{total}$ in accordance with the following equation:

$$gamma_{total} = \frac{\text{total combustion gas (mole)}}{\text{stoichiometric total combustion gas (mole)}}$$

The process of the present invention is carried out at a $gamma_{total}$ value of greater than or equal to 1, preferably 1.05-4.0, and particularly preferably or 1.1-2.0.

The process of the present invention may further comprise supplying a secondary gas comprising oxygen at one or more points within the reaction chamber. However, unlike the primary gas comprising oxygen (e.g., primary air), which is passed from the mixing chamber into the reaction chamber, the secondary gas comprising oxygen (e.g., secondary air) is supplied directly into the reaction chamber.

The ratio of the amount of total gas comprising oxygen (e.g., primary gas comprising oxygen and secondary gas comprising oxygen) to the stoichiometric amount of total gas comprising oxygen required is referred to as $lambda_{total}$ in accordance with the following equation:

$$lambda_{total} = \frac{\text{total gas comprising oxygen (mole)}}{\text{stoichiometric total gas comprising oxygen (mole)}}$$

The process of the present invention is carried out at a $lambda_{total}$ value of greater than or equal to 1, preferably greater than 1 and less than or equal to 10, more preferably 2-9, 3-8, 4-7 or 5-6, and particularly preferably 1.2-2.0.

The one or more hydrolyzable silicon compounds according to the process of the present invention include hydrolyzable silicon compounds that are converted by reaction with water into silicon dioxide. The hydrolyzable silicon compounds may be introduced in vapor form or as a solution in a solvent with which no reaction takes place. The hydrolyzable silicon compounds are preferably introduced in vapor form.

The hydrolyzable silicon compounds are preferably silicon halides, silicon organohalides and/or silicon alkoxides. Specific examples of the one or more hydrolyzable silicon compounds include $SiCl_4$, $MeSiCl_3$, $Me_2SiCl_2$, $Me_3SiCl$, $Me_4Si$, $HSiCl_3$, $Me_2HSiCl$, $MeEtSiCl_2$, $Cl_3SiSiMeCl_2$, $Cl_3SiSiMe_2Cl$, $Cl_3SiSiCl_3$, $MeCl_2SiSiMeCl_2$, $Me_2ClSiSiMeCl_2$, $Me_2ClSiSiClMe_2$, $Me_3SiSiClMe_2$, $Me_3SiSiMe_3$, $MeEtSiCl_2$, tetraethoxysilane, tetramethoxysilane, D4-polysiloxane and/or D5-polysiloxane. Particular preference is given to $SiCl_4$.

The combustion gas (e.g., primary combustion gas and/or secondary combustion gas) is preferably hydrogen, methane, ethane, propane, butane, natural gas and/or carbon monoxide. Particular preference is given to hydrogen.

The gas comprising oxygen (e.g., the primary gas comprising oxygen and/or the secondary gas comprising oxygen) is preferably air (e.g., primary air and/or secondary air), which is optionally enriched with oxygen. The enriched oxygen fraction may generally be present in an amount of up to 35 vol. %.

The process of the present invention may further comprise steam treating the pyrogenic silicon dioxide powder, after separating the pyrogenic silicon dioxide powder from the gaseous substances, with steam and an optional air. The steam treating may be carried out at a temperature of 250-750° C., 300-700° C., 350-650° C., 400-600° C. or 450-550° C. Steam treating serves a number of purposes, including for example, removing unreacted chloride from the surface of the pyrogenic silicon dioxide powder and/or reducing the number of agglomerates. The process of the present invention may be carried out by continuously treating the pyrogenic silicon dioxide powder, from which the gaseous substances have been separated off, with steam and optional air, which is/are flowing in a concurrent or countercurrent direction.

The present invention also provides a dispersion comprising the pyrogenic silicon dioxide powder.

The aqueous phase of the dispersion may contain only water, or alternatively water and an organic solvent. Preference is given to aqueous dispersions, and more particularly aqueous dispersions that comprise 90 wt. % or more of water as the liquid phase.

The dispersion may comprise the pyrogenic silicon dioxide powder of the present invention in an amount of 0.1-50 wt. %, 2.5-40 wt. %, 5-30 wt. % and 7.5-20 wt. %, preferably 5-30 wt. %.

The dispersion may have a pH of 2-11.5. Particular preference is given to an alkaline pH of 8.5-11.5.

Furthermore, the average particle diameter of the silicon dioxide particles in the dispersion may be less than 500 nm (median). Suitable dispersing methods, using high-energy mills, for example, can be used to obtain an average particle diameter of 100-400 nm.

The dispersion of the present invention may be stabilized through the addition of one or more bases, including ammonia, ammonium hydroxide, tetramethylammonium hydroxide, primary, secondary or tertiary organic amines, aqueous sodium hydroxide solution and/or aqueous potassium hydroxide solution.

The dispersion of the present invention may also be stabilized through the addition of one or more acids, including inorganic acids, organic acids or mixtures thereof. Examples of inorganic acids include phosphoric acid, phosphorous acid, nitric acid, sulphuric acid, acidic salts thereof, and mixtures thereof. Examples of organic acids include carboxylic acids of the general formula $C_nH_{2n+1}CO_2H$, wherein n=0-6 or n=8, 10, 12, 14 or 16, or dicarboxylic acids of the general formula $HO_2C(CH_2)_nCO_2H$, wherein n=0-4, or hydroxycarboxylic acids of the general formula $R_1R_2C(OH)CO_2H$, wherein $R_1$=H, $R_2$=$CH_3$, $CH_2CO_2H$ or $CH(OH)CO_2H$, or phthalic acid or salicylic acid, acidic salts thereof, or mixtures thereof.

The dispersion of the present invention may additionally comprise the amino acids alanine, arginine, asparagine, cysteine, glutamine, glycine, histidine, isoleucine, leucine, lysine, methionine, phenylalanine, proline, serine, threonine, tryptophan, tyrosine, valine, salts thereof, or mixtures thereof.

The dispersion of the present invention may further be stabilized through the addition of one or more cationic polymers, one or more aluminum salts, or mixtures of thereof.

Examples of cationic polymers include those having at least one quaternary ammonium group, at least one quaternary phosphonium group, an acid adduct to a primary, secondary or tertiary amine group, polyethylenamine, polydiallylamines, polyallylamines, polyvinylamines, dicyandiamide condensates, dicyandiamide-polyamine cocondensates, polyamide-formaldehyde condensates, or mixtures thereof.

Examples of aluminum salts include aluminum chloride, aluminum hydroxychlorides of the general formula $Al(OH)_nCl$, wherein x=2-8, aluminum chlorate, aluminum sulfate, aluminum nitrate, aluminum hydroxynitrates of the general formula $Al(OH)_xNO_3$, wherein x=2-8, aluminum acetate, alums such as aluminum potassium sulfate or aluminum ammonium sulfate, aluminum formates, aluminum lactate, aluminum oxide, aluminum hydroxide acetate, aluminum isopropoxide, aluminum hydroxide, aluminum silicates and mixtures of the aforementioned compounds.

The dispersion of the present invention may further comprise one or more additives. Additives include, for example, oxidizing agents such as hydrogen peroxide or peracids, oxidation activators that increase the rate of oxidation, or corrosion inhibitors (e.g., benzotriazole), or surface-active substances, which may be nonionic, cationic, anionic or amphoteric in nature.

The dispersion of the present invention can be prepared by processes that are known to skilled artisans. There is no restriction on the nature of the dispersing apparatus. However, it may be advantageous to utilize a dispersing apparatus having a high energy input, especially for preparing highly filled dispersions. Examples of such a dispersing apparatus include rotor-stator systems, planetary kneaders or high-energy mills.

A preferred process for preparing the dispersion involves:
water, which is set to a pH of 2-4 by addition of acids, is circulated in a reservoir with a rotor/stator machine;
while continuously or discontinuously operating a filling apparatus with running of the rotor/stator machine, silicon dioxide powder is introduced into a shearing zone between the slots of rotor teeth and the stator slot, in an amount to produce a preliminary dispersion having a solids content of 20-40 wt. %,
once all of the silicon dioxide powder has been introduced, the filling apparatus is closed and shearing is continued, and
with the dispersing conditions being maintained, the preliminary dispersion is adjusted by dilution to a desired solids content and dispersion pH.

The shearing rate is preferably 10,000-40,000 $s^{-1}$.

When high-energy mills are utilized, an exemplary aspect involves two predispersed suspension streams, which are released through a nozzle under high pressure, striking one another, whereby the particles undergo self-grinding. When high-energy mills are utilized, another exemplary aspect involves placing a preliminary dispersion under high pressure and colliding the particles against reinforced wall regions.

The present invention also provides a polyester film, a catalyst support, a polish for chemical mechanical polishing of metallic and oxidic surfaces, a paint and an ink comprising the pyrogenic silicon dioxide powder or a dispersion comprising the pyrogenic silicon dioxide powder.

The above written description is provided to thereby enable a skilled artisan to practice the invention described and claimed herein. Various modifications to the exemplary aspects will be readily apparent to those skilled in the art, and general principles and features defined herein may be applied to other non-exemplified aspects without departing from the spirit and scope of the present invention. Thus, the present invention is not intended to be limited to the aspects exemplified herein, but is to be accorded the broadest reasonable scope consistent with the general principles and features disclosed herein.

Having generally described the present invention, a further understanding can be obtained by reference to specific examples, which are provided herein merely for purposes of illustration only, and are not intended to be limiting unless otherwise specified.

EXAMPLES

Analysis

The dibutyl phthalate (DBP) absorption is measured using a RHEOCORD 90 instrument manufactured by Haake (Karlsruhe, Germany). This is performed by introducing 8 g of the silicon dioxide powder, to an accuracy of 0.001 g, into a kneading chamber, closing this chamber with a lid and metering DBP absorption via a hole in the lid at a predetermined metering rate of 0.0667 ml/s. The kneader is operated with a rotational speed of 125 revolutions per minute. When the maximum torque is reached, the kneader and the DBP feed are switched off automatically. The DBP absorption is calculated from the amount of DBP consumed and the amount of particles introduced, as follows:

DBP number=[consumption of DBP$(g)$÷initial mass of particles$(g)$]×100.

Example 1

Preparation of Inventive Pyrogenic Silicon Dioxide Powder 108 kg/h silicon tetrachloride, 14 m$^3$/h (stp) hydrogen (primary combustion gas) and 140 m$^3$/h (stp) air (primary gas comprising oxygen) were mixed in a burner, and the mixture was ignited and burnt into a reaction chamber. 21 m$^3$/h (stp) hydrogen (secondary combustion gas) and 40 m$^3$/h (stp) air (secondary gas comprising oxygen) were additionally supplied to the reaction chamber.

As calculated from these amounts, gamma$_{primary}$ is 0.50, gamma$_{total}$ is 1.24, lambda$_{primary}$ is 4.13 and lambda$_{total}$ is 1.67.

The resulting pyrogenic silicon dioxide powder was isolated in a downstream filter and subsequently treated countercurrently with air and steam at a temperature of 520° C.

This process yielded a pyrogenic silicon dioxide powder having the properties reported in Table 2 below.

Examples 2-13

Preparation of Inventive Pyrogenic Silicon Dioxide Powder

Examples 2-13 were carried out in a manner analogous to that described in Example 1, with the exception of the respective amounts of starting materials, as reported in Table 1.

The properties of the pyrogenic silicon dioxide powders obtained from Examples 1-13 are reported in Table 2.

FIG. 1 illustrates thickening (mPas) as a function of STSA (m$^2$/g). The thickening is determined as described above using Ludopal P6. The inventive pyrogenic silicon dioxide powders of Examples 1-13 (♦) are contrasted with the conventional fumed silica powders (□) of Aerosil® 130, Aerosil® 150, Aerosil® 200, Aerosil® 300 and Aerosil® 380, which are commercially available from Evonik Degussa. The recited order of the previously mentioned conventional powders (□) of Aerosil® are respectively presented in FIG. 1 in the order of increasing STSA. FIG. 1 illustrates the significantly lower thickening (mPas) properties of the pyrogenic silicon dioxide powders of the present invention, as compared to the significantly higher thickening (mPas) properties of the conventional fumed silica powders.

Example 14

Preparation of Inventive Dispersion 37.14 kg of deionized water was introduced and 20 kg of pyrogenic silicon dioxide powder from Example 1 was drawn in under suction over the course of 10 minutes, using a Conti-TDS 3, followed by shearing for 15 minutes. Subsequently 21 kg of deionized water and 4.3 kg of 30 wt. % of an aqueous potassium hydroxide solution was added. A dispersion was obtained having a pH of 10.5 and a silicon dioxide fraction of 25 wt. % and having an average particle diameter (median) of 0.4 μm.

TABLE 1

Reactant Amounts

| | | Hydrogen | | Air | | gamma | | lambda | |
|---|---|---|---|---|---|---|---|---|---|
| | SiCl$_4$ | Primary | Secondary | Primary | Secondary | | | | |
| Example | kg/h | m$^3$/h (stp) | m$^3$/h (stp) | m$^3$/h (stp) | m$^3$/h (stp) | Primary | Total | Primary | Total |
| 1 | 108 | 14 | 21 | 140 | 40 | 0.50 | 1.24 | 4.13 | 1.67 |
| 2 | 108 | 14 | 21 | 140 | 40 | 0.50 | 1.24 | 4.13 | 1.67 |
| 3 | 108 | 14 | 21 | 120 | 40 | 0.50 | 1.24 | 3.54 | 1.43 |
| 4 | 108 | 17 | 21 | 140 | 40 | 0.60 | 1.35 | 3.40 | 1.54 |
| 5 | 108 | 14 | 21 | 120 | 40 | 0.50 | 1.24 | 3.54 | 1.43 |
| 6 | 108 | 14 | 21 | 85 | 40 | 0.50 | 1.24 | 4.18 | 1.69 |
| 7 | 108 | 20 | 21 | 140 | 40 | 0.71 | 1.45 | 2.90 | 1.43 |
| 8 | 108 | 14 | 21 | 100 | 40 | 0.50 | 1.24 | 2.95 | 1.20 |
| 9 | 108 | 17 | 21 | 120 | 40 | 0.60 | 1.35 | 2.92 | 1.32 |
| 10 | 108 | 14 | 21 | 100 | 40 | 0.50 | 1.24 | 2.95 | 1.20 |
| 11 | 108 | 22 | 21 | 140 | 40 | 0.78 | 1.53 | 2.64 | 1.36 |
| 12 | 108 | 17 | 21 | 100 | 40 | 0.60 | 1.35 | 2.44 | 1.10 |
| 13 | 108 | 20 | 21 | 120 | 40 | 0.71 | 1.45 | 2.49 | 1.22 |

TABLE 2

Physicochemical Properties of the Inventive Pyrogenic Silicon Dioxide Powders

| | Surface area | | Thickening/ | | Pore volume | | | | Ø primary | |
| --- | --- | --- | --- | --- | --- | --- | --- | --- | --- | --- |
| Example | STSA $m^2/g$ | BET $m^2/g$ | Thickening mPas | STSA mPas·g/m | Micro $cm^3/g$ | Meso $cm^3/g$ | Total $cm^3/g$ | $D_m$ | particle nm | DBP g/100 g |
| 1 | 118 | 269 | 840 | 7.12 | 0.063 | 0.310 | 0.45 | 2.7740 | 22.9 | 256 |
| 2 | 122 | 293 | 876 | 7.18 | 0.078 | 0.246 | 0.55 | 2.7600 | 21.7 | 256 |
| 3 | 163 | 297 | 999 | 6.13 | 0.060 | 0.280 | 0.57 | 2.7350 | 27.0 | 276 |
| 4 | 171 | 310 | 982 | 5.74 | 0.039 | 0.520 | 0.63 | 2.6430 | 20.1 | 266 |
| 5 | 177 | 330 | 1263 | 7.14 | 0.072 | 0.341 | 0.67 | 2.7100 | 15.6 | 278 |
| 6 | 195 | 327 | 1199 | 6.15 | 0.061 | 0.359 | 0.65 | 2.6870 | 11.1 | 299 |
| 7 | 214 | 363 | 1435 | 6.71 | 0.069 | 0.405 | 0.70 | 2.6890 | 10.8 | 300 |
| 8 | 218 | 337 | 1263 | 5.79 | 0.054 | 0.350 | 0.67 | 2.7030 | 17.0 | 297 |
| 9 | 223 | 351 | 1360 | 6.10 | 0.057 | 0.410 | 0.84 | 2.6940 | 15.6 | 298 |
| 10 | 237 | 353 | 1692 | 7.14 | 0.059 | 0.437 | 0.74 | 2.6710 | 10.0 | 310 |
| 11 | 273 | 355 | 1799 | 6.59 | 0.039 | 0.520 | 1.04 | 2.6430 | 15.2 | 310 |
| 12 | 275 | 356 | 1788 | 6.50 | 0.038 | 0.510 | 0.92 | 2.6490 | 14.7 | 327 |
| 13 | 297 | 368 | 1895 | 6.38 | 0.033 | 0.560 | 1.08 | 2.6300 | 13.6 | 313 |

Numerous modifications and variations on the present invention are obviously possible in light of the above disclosure and thus the present invention may be practiced otherwise than as specifically described herein without departing from sprit and scope of the present invention. Accordingly, it is therefore to be understood that the foregoing disclosure is merely illustrative of exemplary aspects of the present invention and that numerous modifications and variations can be readily made by skilled artisans that fall within the scope of the accompanying claims.

The invention claimed is:

1. A pyrogenically prepared silicon dioxide powder in the form of aggregated primary particles having a statistical thickness surface area (STSA) of 10-500 $m^2/g$, a thickening action based on the STSA of 4-8 mPas·g/$m^2$, and a micropore volume of 0.030-0.070 $cm^3/g$.

2. The pyrogenically prepared silicon dioxide powder according to claim 1, wherein the STSA is 30-300 $m^2/g$.

3. The pyrogenically prepared silicon dioxide powder according to claim 1, wherein the thickening action, based on the STSA, is 5-7 mPas·g/$m^2$.

4. The pyrogenically prepared silicon dioxide powder according to claim 1, wherein the micropore volume is 0.035-0.065 $cm^3/g$.

5. The pyrogenically prepared silicon dioxide powder according to claim 1, wherein the pyrogenically prepared silicon dioxide powder has a fractal dimension ($D_m$) of greater than 2.61 but less than or equal to 2.85.

6. The pyrogenically prepared silicon dioxide powder according to claim 1, wherein the pyrogenically prepared silicon dioxide powder has an average primary particle diameter of greater than 10 nm and less than 40 nm.

7. The pyrogenically prepared silicon dioxide powder according to claim 1, wherein the pyrogenically prepared silicon dioxide powder has a dibutyl phthalate (DBP) absorption of less than or equal to 300 g/100 g dibutyl phthalate.

8. A process for preparing the pyrogenic silicon dioxide powder according to claim 1, wherein the process comprises:
introducing one or more hydrolyzable silicon compounds, a primary gas comprising oxygen, and a primary combustion gas into a mixing chamber to produce a mixture;
igniting the mixture in a burner to produce a flame, which is burned into a reaction chamber to produce the pyrogenic silicon dioxide powder and gaseous substances; and
separating the pyrogenic silicon dioxide powder from the gaseous substances,
wherein a ratio of the amount of primary combustion gas introduced to a stoichiometric amount of primary combustion gas required is referred to as $gamma_{primary}$ and has a value of less than 1, and
wherein a ratio of the amount of primary gas comprising oxygen introduced to a stoichiometric amount of primary gas comprising oxygen required is referred to as $lambda_{primary}$ and has a value of greater than 1.

9. The process according to claim 8, wherein $gamma_{primary}$ has a value of 0.4-0.9.

10. The process according to claim 8, wherein $lambda_{primary}$ has a value of greater than 1 and less than or equal to 10.

11. The process according to claim 8, wherein the process further comprises:
supplying a secondary combustion gas at one or more points within the reaction chamber.

12. The process according to claim 11, wherein a ratio of an amount of a total combustion gas comprising the primary combustion gas and the secondary combustion gas to a stoichiometric amount of the total combustion gas required is referred to as $gamma_{total}$ and has a value of greater than or equal to 1.

13. The process according to claim 12, wherein $gamma_{total}$ has a value of 1.05-4.0.

14. The process according to claim 11, wherein the secondary combustion gas is one or more gases selected from the group consisting of hydrogen, methane, ethane, propane, butane, natural gas or carbon monoxide.

15. The process according to claim 8, wherein the process further comprises:
supplying a secondary gas comprising oxygen at one or more points within the reaction chamber.

16. The process according to claim 15, wherein a ratio of an amount of a total gas comprising oxygen, which comprises the primary gas comprising oxygen and the secondary gas comprising oxygen, to a stoichiometric amount of the total gas comprising oxygen required is referred to as $lambda_{total}$ and has a value of greater than or equal to 1.

17. The process according to claim 16, wherein $lambda_{total}$ has a value of greater than 1 and less than or equal to 10.

18. The process according to claim 15, wherein the secondary gas comprising oxygen is air or air enriched with oxygen.

19. The process according to claim 8, wherein the hydrolyzable silicon compounds are introduced in vapor form.

20. The process according to claim 8, wherein the hydrolyzable silicon compounds are selected from the group consisting of silicon halides, silicon organohalides and/or silicon alkoxides.

21. The process according to claim 8, wherein the primary combustion gas is one or more gases selected from the group consisting of hydrogen, methane, ethane, propane, butane, natural gas or carbon monoxide.

22. The process according to claim 8, wherein the primary gas comprising oxygen is air or air enriched with oxygen.

23. A dispersion comprising the pyrogenic silicon dioxide powder according to claim 1.

24. The dispersion according to claim 23, wherein the dispersion comprises the pyrogenic silicon dioxide powder in an amount of 0.1-50 wt. %.

25. The dispersion according to claim 23, wherein the dispersion has a pH of 2-11.5.

26. The dispersion according to claim 23, wherein an average particle diameter of the pyrogenic silicon dioxide powder in the dispersion is less than 500 nm.

27. A product comprising the dispersion according to claim 23, wherein the product is selected from the group consisting of a polyester film, a catalyst support, a polish for chemical mechanical polishing of metallic surfaces, a polish for chemical mechanical polishing of oxidic surfaces, a paint and an ink.

28. A product comprising the pyrogenic silicon dioxide powder according to claim 1, wherein the product is selected from the group consisting of a polyester film, a catalyst support, a polish for chemical mechanical polishing of metallic and oxidic surfaces, a paint and an ink.

* * * * *